United States Patent

Bellis

[15] 3,666,988

[45] May 30, 1972

[54] TOUCH SENSITIVE POWER CONTROL CIRCUIT

[72] Inventor: Robert E. Bellis, 700 7th Street, Boulder City, Nev. 89005

[22] Filed: Jan. 22, 1970

[21] Appl. No.: 4,887

[52] U.S. Cl. ..........................315/208, 307/116, 307/252 B, 307/252 N, 315/268, 315/362, 328/5, 340/258 C

[51] Int. Cl. ...............H01h 35/00, H03k 17/72, H05b 37/02

[58] Field of Search ..................315/362, 178, 179, 182, 185, 315/186, 189, 193, 200, 208, 131, 135, 136, 268; 328/195, 196, 206, 5; 307/252 B, 252 N, 292, 305, 116; 317/148.5, 146; 331/65; 340/258 C; 324/61 R

[56] References Cited

UNITED STATES PATENTS

| | | | |
|---|---|---|---|
| 3,255,380 | 6/1966 | Atkins et al. | 340/258 C X |
| 3,320,437 | 5/1967 | Myers | 307/252 |
| 3,462,613 | 8/1969 | Wolf | 307/292 X |
| 3,508,120 | 4/1970 | Atkins | 315/362 X |
| 3,493,791 | 2/1970 | Adelson et al. | 307/305 X |

OTHER PUBLICATIONS

Galloway, " Using the Triac for Control of AC Power," General Electric Application Note 200.35, March 1966, p. 16.

*Primary Examiner*—Roy Lake
*Assistant Examiner*—Siegfried H. Grimm
*Attorney*—William J. Bethurum

[57] ABSTRACT

Disclosed is a capacitance responsive and touch sensitive power control circuit for an incandescent lamp or the like. A bidirectional AC semiconductor switch, such as a TRIAC, operatively connects and disconnects a lamp in series with power supply terminals, and the bidirectional semiconductor switch is alternately driven to conduction and nonconduction by a bistable flip-flop. A touch signal input circuit provides a triggering signal for the bistable flip-flop in response to body capacitance input signals applied thereto.

5 Claims, 2 Drawing Figures

INVENTOR.
Robert E. Bellis
BY
William J. Bethurum
ATTY.

TOUCH SENSITIVE POWER CONTROL CIRCUIT

BACKGROUND OF THE INVENTION

This invention relates generally to power control circuits for touch sensitive lamps and more particularly to a touch control and body capacitance actuated transistorized lamp control circuit.

Transistorized, body capacitance actuated power circuits for incandescent lamps, alarm clocks and a variety of other household appliances are well known in the electrical arts. For example, it is known in the electrical arts to utilize body capacitance to vary the current conduction in a transistor circuit and then to utilize such variation in current conduction in the transistor circuit to in turn energize an electro-mechanical relay or the like. Such relay has been used in the past to open or close an electrical circuit between an incandescent lamp and a power supply, and the relay is operative to either connect or disconnect the incandescent lamp to the power supply in accordance with a body capacitance input signal applied to the transistor circuit.

Electro-mechanical relays have the usual disadvantages associated with wear and failure of mechanical moving parts. The cost of the relay coil, which is usually made of copper, is quite high, for example, when compared to presently available commercial semiconductor devices. These prior art power control circuits which include the above mechanical relays were frequently vacuum or gas tube powered and were quite succeptible to inadvertent operation by line noise.

OBJECTS OF THE INVENTION

Accordingly, an object of the present invention is to provide a new and improved solid state power control circuit for controlling the conductive state of incandescent lamps and the like. This novel power control circuit is operative to be positively controlled with the required input signal sensitivity by the connection of human body capacitance between one input terminal of the circuit and a point of reference potential.

Another object of this invention is to provide a new and improved transistorized power control circuit of the type described which requires no moving parts, such as electro-mechanical relays.

Another object of this invention is to provide a new and improved circuit of the type described which is relatively inexpensive to build and which is extremely reliable in operation and durable in life.

FEATURES OF THE INVENTION

A feature of the present invention is the provision of a capacitance responsive circuit means including a touch signal input transistor circuit coupled through an interconnecting triggering circuit to a bistable flip-flop. The conductive state of the bistable flip-flop is controlled by successive body capacitance signals applied to the touch signal input circuit.

Another feature of this invention is the provision of a semiconductor bidirectional switch, such as a TRIAC, and the gate of this TRIAC is connected to the output of one side of the bistable flip-flop. This bidirectional semiconductor switch is controlled and driven to successive states of conduction and nonconduction to thereby connect and disconnect, respectively, an incandescent lamp to an AC power supply.

Another feature of this invention is the provision of a trigger network connected between the touch signal input circuit and the bistable flip-flop. This trigger network couples the output of the touch signal input circuit to separate inputs of the bistable flip-flop for alternately changing the conductive state of the flip-flop.

Another feature of this invention is the provision of an input transistor within the touch signal input circuit. This input transistor is operatively biased to alter its conduction in response to a body capacitance input signal, thereby providing a corresponding variation in output voltage of the touch signal input circuit. This voltage variation is coupled to both inputs of first and second cross connected transistors within the bistable flip-flop.

Another feature of this invention is the provision of a relatively inexpensive AC to DC converter circuit which is especially adapted to power the previously identified circuit components of this invention. This converter circuit interconnects a standard 117 volt AC home outlet to the bistable flip-flop and the touch signal input circuit to simultaneously provide DC power for each of these portions of the lamp control circuit disclosed and claimed herein. The nonrectified AC voltage is also applied across the series connection of the lamp and the TRIAC, and a DC flip-flop output voltage applied to the TRIAC gate controls conduction in the TRIAC and thus current flow in the lamp.

The above and other objects and features of this invention will become more fully apparent and readily understood from the following description of the accompanying drawing.

DRAWINGS

FIG. 1 is a functional block diagram of the touch sensitive lamp control system according to the present invention; and FIG. 2 is a schematic diagram of the invention.

Like reference numerals have been used in FIGS. 1 and 2 to designate corresponding circuit portions in these two figures.

BRIEF DESCRIPTION OF THE INVENTION

Briefly described, the touch responsive circuit of the present invention includes a bidirectional triggerable switch, such as a semiconductor TRIAC, having a control or gate electrode G for receiving a turn-on and turn-off signal. The triggerable switch interconnects an incandescent lamp or the like with an AC power source, and the gate electrode G is connected to a capacitive responsive circuit. Upon receiving a body capacitance signal at the input of the capacitance responsive circuit, a DC turn-on or turn-off signal is applied via a flip-flop in the capacitance responsive circuit to the control electrode of the triggerable switch. The triggerable switch responds to connect and disconnect the incandescent lamp or the like to an AC power source.

DETAILED DESCRIPTION OF THE INVENTION

Figures 1, 2:
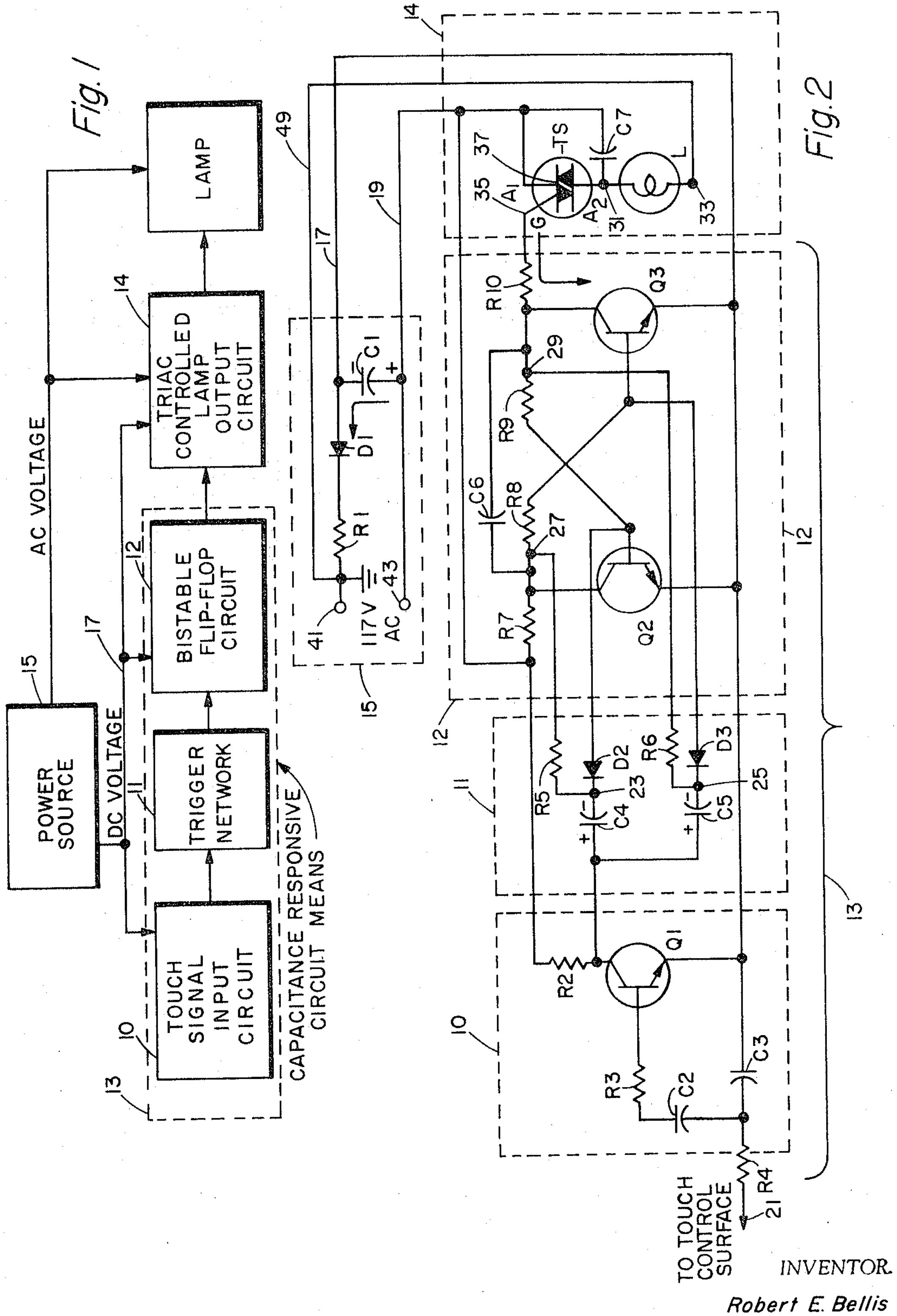

In its system and functional block diagram embodiment, the present invention includes, as shown in FIG. 1, a touch signal input circuit 10 which is interconnected through a trigger network 11 to the bistable flip-flop circuit 12. The bistable flip-flop circuit 12 drives the TRIAC controlled lamp output circuit 14. A single DC power source 15 powers the circuit portions 10 and 12, and the circuit components 10, 11 and 12 which have been previously identified functionally comprise a capacitance responsive circuit means 13. The 117 volt AC input line voltage is applied to conductors 19 and 49 and is applied to circuit nodes 33 and 37 and shown.

Referring in detail to FIG. 2, the touch signal input circuit 10 includes a high gain input transistor Q1 having its emitter connected to the negative side 17 of the DC power source 15 and its collector coupled through resistor R2 to the positive side 19 of the DC power supply 15. The transistor Q1 is an NPN type having its base or input electrode interconnected through resistor R3, AC coupling capacitor C2, and a high resistance R4 to the touch control surface (not shown) which is represented by input terminal 21. The input terminal 21 is intended to represent any touch control surface to which a portion of the human body, such as a person's finger, may capacitively connect this electrical conductor 21 to ground potential or some other point of reference potential.

An additional capacitor C3 interconnects the emitter of transistor Q1 to the junction of capacitor C2 and resistor R4. For optimum circuit sensitivity, capacitor C3 is selected to balance the residual conduction of transistor Q1 due to 60-cycle hum noise. The value of capacitor C3 is somewhat dependent upon the size and electrical environment of the touch control surface.

Resistor R4 provides very high resistance isolation (10–20 megohms) between the touch control surface and the power control circuit to preclude any detectable current flow by the person touching the control surface, even though the person touching this surface is solidly grounded.

The collector output of NPN transistor Q1 provides a negative going output voltage pulse in response to body capacitance input signals applied between the touch control terminal 21 and ground or reference potential. This negative going output signal is caused by an increase in transistor Q1 base current caused when a person touches terminal 21. The small increase in transistor Q1 base current required to charge a person's body capacitance causes an amplified increase in Q1 collector current and thus produces a negative going collector voltage at the output of transistor Q1. The collector voltage of Q1 is applied simultaneously to individual plates of the two capacitors C4 and C5 in the interconnecting trigger network 11. The trigger network 11 further includes a pair of diodes D2 and D3 which are connected, respectively, to the other plates of capacitors C4 and C5. Resistors R5 and R6 interconnect the common nodes 23 and 25 to the circuit nodes 27 and 29 in the bistable flip-flop circuit 12 to be subsequently described. The negative going pulses at the collector of Q1 are thus simultaneously coupled via diodes D2 and D3 to the bases of transistors Q2 and Q3 in the bistable flip-flop circuit 12.

The bistable circuit 12 comprises an NPN, transistorized bistable flip-flop including NPN transistors Q2 and Q3 which are cross coupled, collector-to-base, via resistors R8 and R9. A capacitor C6 directly interconnects the collectors of NPN transistors Q2 and Q3. A load resistor R7 interconnects the collector of NPN transistor Q2 to the positive side of the power supply 15. The collector of NPN transistor Q3 is interconnected through a load resistor R10 to the gate G or control electrode 35 of the bidirectional triggerable switch TS in the lamp output circuit 14.

The lamp output circuit 14 includes a pair of load terminals 31 and 33 between which an incandescent lamp or the like may be connected and powered by the circuit operation to be described in more detail below. A bilateral or bidirectional triggerable switch TS, such as a semiconductor TRIAC, has one anode thereof connected to the load terminal 31 and the other anode connected to one terminal 43 of the AC line. The control or gate terminal 35 of TRIAC TS is connected to collector load resistor R10 as previously mentioned. Capacitor C7 is connected between the other main electrode 37 of the triggerable switch TS and the load terminal 31, and capacitors C6 and C7 are stabilizing capacitors which prevent line noise from falsely triggering the flip-flop circuit 12. The TRIAC is well known four layer bidirectional semiconductor switch and is described in detail in Electronics Magazine, Feb. 19, 1968, page 169, article entitled "The Triac — from Trickle to Triumph in Three Years."

When the TRIAC TS conducts, the lamp L is electrically connected across the AC power supply lines 49 and 19. The triggerable switch TS conducts when the NPN transistor Q3 in the bistable flip-flop circuit 12 conducts, so that the gate current for the triggerable bidirectional switch TS flows through the gate electrode 35 and through the collector load resistor 10 into the collector of NPN transistor Q3 during the conduction of the latter.

The transistors Q2 and Q3 are alternately biased to conduction and nonconduction by successive negative going voltage pulses coupled through diodes D2 and D3, and TRIAC TS conducts to energize lamp L when transistor Q3 in the flip-flop circuit 12 conducts. When Q2 conducts, TS is turned-off and the lamp L is de-energized.

The power source 15 includes a current limiting resistor R1 which interconnects a rectifying diode D1 and one input terminal 41 of a standard household AC outlet (not shown). A filter capacitor C1 connects the anode of diode D1 to the other AC input terminal 43 and smooths the DC ripple voltage between lines 17 and 19 at the DC output of the power source 15. The ungrounded side 19 of the AC line, which also comprises the positive side of the DC supply 19, is connected to anode 37 of the bidirectional triggerable switch TS, and is also connected to the first and second load resistors R2 and R7 at the collectors of transistors Q2, respectively.

The present invention may be practice other than as specifically described above. For example, the invention is not limited to use with incandescent lamps and can be used with a wide variety of electrical household appliances such as alarm clocks, radios, television sets and any other appliances having the required touch sensitive surface.

The flip-flop stage 12 of the present invention is not limited to the specific cross coupled transistorized flip-flop shown, and other flip-flop designs may be used in place of the bistable circuit 12 within the scope of this invention.

The touch signal input circuit 10 is not limited to the particular type of bipolar transistor circuit shown and may be fabricated using insulated gate, metal-oxide-silicon field-effect transistors. These high input impedance devices are sometimes referred to as MOSFETs or IGFETs.

The above described circuit has been optimized, miniaturized, and tested in actual service. As finally produced, it is assembled on a printed circuit board measuring 1 inch × 1 ½ inches. The highest component measures less than five-eighths inch, so the entire unit occupies a space measuring 1 inch × 1 ½ inches × ⅝ inch. The circuit is capable of handling a 100 watt load at 116 volts AC, but may be used as a driver for larger TRIACs to handle larger loads.

I claim:

1. A capacitance responsive power control circuit including, in combination:

a. a load terminal, b. a semiconductor TRIAC connected to said load terminal and having a control electrode thereof for receiving a control signal, c. a bistable flip-flop having first and second cross coupled transistors therein, said flip-flop coupled to said control electrode of said semiconductor TRIAC for turning said TRIAC on and off, d. a touch signal input circuit operative to receive body capacitance connections for altering the conduction therein, e. a trigger network interconnecting said touch signal input circuit and said bistable flip-flop for coupling voltage transitions at said touch signal input circuit to said first and second transistors of said flip-flop and driving said flip-flop successively from one to the other of its two conductive states, thereby applying turn-on and turn-off signals to said control electrode of said TRIAC, said trigger network including:

f. first and second capacitors connected to the output of said touch signal input circuit, g. first and second diodes interconnecting, respectively, said first and second capacitors to said first and second transistors in said flip-flop for selectively passing voltage transitions to said first and second transistors to change the conductive states thereof, and h. first and second resistors interconnecting, respectively, outputs of said first and second transistors to electrical junctions between said capacitors and diodes to provide self gating flip-flop, whereby one of said first and second diodes blocks pulses of one polarity applied thereto to insure that a single pulse at a time is passed to said flip-flop to initiate a change in the conductive state of the flip-flop.

2. The control circuit defined in claim 1 wherein said touch signal input circuit includes a bipolar transistor having an input electrode thereof connected to receive a body capacitance input signal to vary the conduction in said bipolar transistor and thereby provide a variable output signal to be coupled via said trigger network to said first and second transistors in said bistable flip-flop.

3. The control circuit defined in claim 2 which further includes:

a. a DC power supply connected to each of said bistable flip-flop and said touch signal input circuit for providing a single DC operating voltage therefor, and b. an incandescent lamp connected in series with alternating voltage line terminals and the anodes of said TRIAC for receiving turn-on and turn-off current through said TRIAC.

4. A capacitance responsive power control circuit including, in combination:

a. an output node, b. a bidirectional triggerable switch connected to said output node and having a control electrode thereof for receiving a control signal, and c. capacitance responsive circuit means connected to said control electrode and including a bistable flip-flop having first and second transistors therein cross coupled for alternate conduction during bistable switching, said flip-flop responsive to voltage transitions at a single common circuit node for switching between two stable states and thereby generating control signals which are coupled to said control electrode of said bidirectional triggerable switch for controlling the conductive state thereof, said capacitance responsive circuit means further including d. an input transistor having an input electrode thereof connected to receive body capacitance input signals which vary the conduction of said input transistor and generate a variable output signal, and e. a trigger network including a first capacitor and a first diode connecting said input transistor to one of said transistors in said flip-flop, and a second capacitor and a second diode connecting said input transistor to the other transistor in said flip-flop, whereby voltage transitions at the output electrode of said input transistor are coupled directly through the above capacitor-diode networks to alternately turn on and off said first and second transistors in said flip-flop and generate control signals at the output of said flip-flop for changing the conductive state of said bidirectional triggerable switch, whereby the voltage transitions at said common circuit node may be generated by the charging of a person's body capacitance from a single common input touch node and said single input touch node can be interconnected to a single touch control surface of a selected appliance to be turned on and off.

5. The circuit defined in claim 4 wherein said triggerable switch is a semiconductor TRIAC connectable to a lamp and operative to electrically connect and disconnect said lamp to a power supply, whereby said lamp can be turned on and off by the successive contacts of a person's body to said single common input touch node or to a conductive appliance surface connected thereto.

* * * * *